C. H. JOHNSON.
COASTER.
APPLICATION FILED DEC. 1, 1916.
1,274,889.
Patented Aug. 6, 1918.
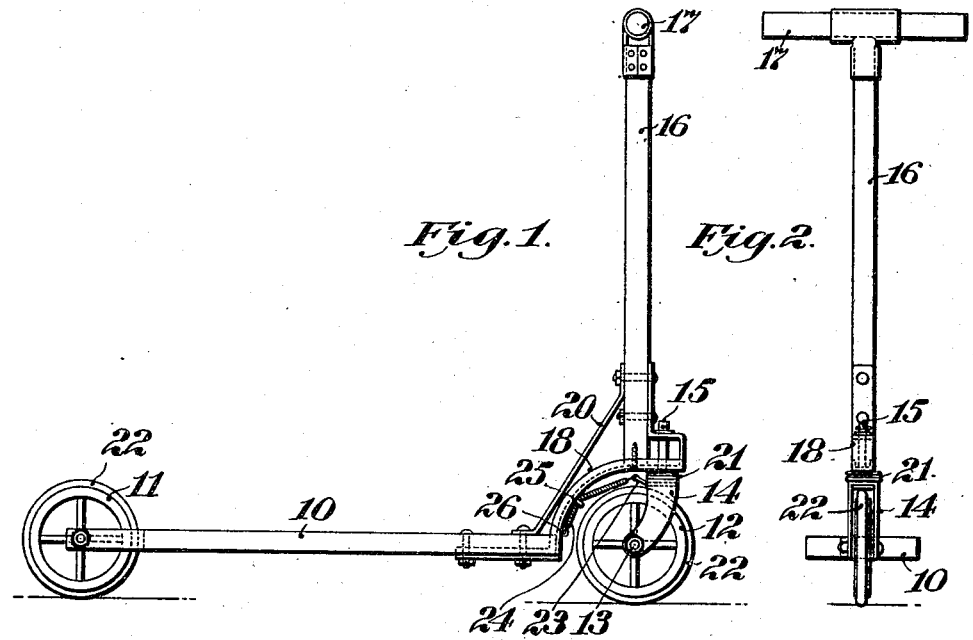
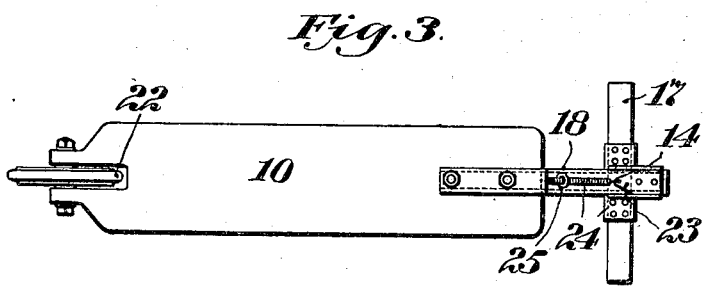
Inventor:
Charles H. Johnson.
BY Mitchell, Chadwick & Kent
Attys

UNITED STATES PATENT OFFICE.

CHARLES H. JOHNSON, OF NEWTON, MASSACHUSETTS.

COASTER.

1,274,889.

Specification of Letters Patent.

Patented Aug. 6, 1918.

Application filed December 1, 1916. Serial No. 134,233.

*To all whom it may concern:*

Be it known that I, CHARLES H. JOHNSON, a citizen of the United States, residing at Newton, in the county of Middlesex and State of Massachusetts, have invented new and useful Improvements in Coasters, of which the following is a specification.

This invention relates to improvements in coasters or hop cars. More particularly it relates to devices in which two wheels arranged tandem support a platform close to the ground, with room for a person to stand thereon, there being also a handle for convenience in steering, which may be effected by merely tipping the platform as explained in the U. S. Letters Patent to Luke S. Murdock, No. 1,056,357 of March 18, 1913. The invention relates especially to improvements affecting the steering and to important details of construction in the relation of the handle and platform to the wheels, to each other and to the swivel, for the automatic operation of the steering wheel. Among the objects are to allow use of large wheels without raising the platform more than two to three inches above the ground, to improve the ease of maintaining equilibrium, to increase the responsiveness of the steering wheel, and to combine the handle with the other parts in a way that does not interfere with the bearing of the steering head, is inexpensive in construction, and yet is strong and not inconvenient. These objects and other advantages provided by the invention are attained in the manner shown in the accompanying drawings, in which:

Figure 1 is a side elevation of apparatus embodying the invention;

Fig. 2 is a front elevation of the same; and

Fig. 3 is a plan of the same.

Referring to the drawings, and bearing in mind the principle of automatic steering set forth in the said Murdock patent, the principal parts of the device are shown by the platform 10; the relatively high rear wheel 11 with axis fixed with respect to the platform; and the equally high front wheel 12, mounted as a caster wheel whose normally horizontal axle 13 is carried by a fork 14 held and swiveled a little forward of the axle by a spindle 15 extending vertically or nearly so. Prior to the Murdock invention it was thought necessary, so far as I am aware, to provide means by which the handle might turn the front wheel to the right or left for steering. This involved provision of a steering head and direct connection between the handle and the front wheel fork. The said Murdock invention discloses how the handle may be made rigid with respect to the platform 10. In the present invention a handle 16 that is mounted rigidly with respect to the platform 10 is preferably employed, although by reason of certain features it may be possible to dispense with the handle entirely if desired. This handle 16, which may have a cross piece 17 at its top, is secured rigidly at its bottom to a stiff metallic bow 18, which, springing rigidly from the forward end of the platform 10, is outrigged forward of it and is curved up and over the steering wheel to a point forward of its axle. The handle is illustrated as standing approximately in line with the axle, vertically over it, but it may stand inclined toward the rear if considered more convenient. The platform 10 is set at or below the level of the said axle, depending on the diameter of the wheel. The handle, which is preferably of wood, is secured rigidly by being stepped on the said bow, braced on the platform by a strut 20 and braced forward by a reversely upturned continuation of the bow 18. The said bow, as illustrated, is a strip of sheet metal formed with a flanged or U-shaped cross section. The flanges afford the necessary stiffness; so that in the preferred form this is made of a single piece of metal, with the flanged part curving around the steering wheel; with a rear extension on which the forward end of the platform 10 rests and is supported; and with a reversely bent forward part affording two supports for the spindle 15 of the fork of the steering wheel, at well separated points; and with a continuation strap rising vertically above that along the front face of the handle. The connections to the handle and to the platform may be by simple bolts, if the handle be of wood, as illustrated. Joints may be welded if the steering post is metallic. The spindle may have a ball bearing 21 arranged as a combined thrust and radial bearing, on which the bow rests while permitting the spindle and fork to turn easily. The weight of the load passes through this to the fork and axle.

The platform as a whole is thus held as close to the ground as may be desired. In the form illustrated the platform is horizontal and at the level of the axles of the wheels. This construction permits the use of wheels six inches in diameter, more or less, large enough to give easy running, to which rubber tires 22 may be fitted and with which considerable speed may be attained quietly, while the depressing of the platform to near the ground level makes the whole apparatus easy to keep in equilibrium, as contrasted with the difficulty of balancing the weight of the rider at a level above the tops of the wheels. I find that in practice six inch wheels and a three inch elevation for the platform work satisfactorily, but the platform can be put lower or higher. Either end of it can be put lower than the other if desired.

Extending rearwardly from the crotch of the fork 14 is an arm 23 to which is attached a spiral spring 24 passing through a supporting ring 25 to a fastening or anchorage 26 on the rigid curved bow. Said supporting ring is loosely pivoted on the bow 18 and the said anchorage is located behind it on the bow 18, on the central fore-and-aft line of the vehicle. This spring, tending always to pull the arm 23 back into the fore-and-aft line, has the effect of restoring the wheel promptly and automatically to a direction straight ahead whenever the platform 10 is swung into a level from a tipped position.

In operation, whenever the car is in motion with a load on the platform 10, and the platform 10 is tipped toward either side, the steering wheel automatically turns so that it will run toward that side, thus steering the car. This is because the spindle 15, which is the forward point of suspension of the platform, is forward of the point where the tire of the wheel makes contact with the ground, which is herein for brevity called the "tread". Whenever the apparatus is upright the downward pull of gravity is in the vertical plane passing through the treads of the two wheels and is perpendicular to the plane in which the spindle moves, if swung to the right or left about the tread, as would happen if it were turned manually to steer. Whenever the platform is tipped sidewise, so that its rigidly connected bow 18 is swung laterally in an arc around the horizontal line passing through both treads, the force of gravity no longer acts in the plane passing through the spindle and the treads of the two wheels, and no longer is perpendicular to the plane in which the spindle would move if swung about the tread. The spindle can get lower by swinging farther in the direction in which the tipping occurred. Impelled by the weight on the platform, it does so. The front end of the bow 18 necessarily moves with it, swinging about the tread of the rear wheel, and going a little farther down from its original vertical plane than the point to which it was moved by the initial lateral tipping of the platform. This further movement causes the fork of the steering wheel to turn about the tread of that wheel, which is in engagement with the ground at a little distance behind the spindle; and this steers the car. Of course centrifugal force introduces a complication, but a full analysis of resultant and component forces is not necessary to an understanding of the fact that a car constructed as described can be steered by merely tipping it while moving. From the foregoing it will also be clear that the construction illustrated, in which the spindle is more than twice as high above the ground as is the top of the platform, has consequently more than twice as much lateral movement. In other words, a desired extent of turning of the steering wheel is attained with less than half as much movement of the platform as would be required if the platform were on the level of the spindle, or above it. This makes the car more steady and less cranky than if the platform were at the higher level. It also permits the user to tip the handle considerably to either side, tipping the platform proportionally of course, but without tipping the platform an actual distance great enough to disturb his balance dangerously.

The turning of the steering wheel is always resisted by the spring 24. This resistance is negligible when the platform is tipped because the weight of the user is always sufficient to overcome it to any degree desired; but when the car is restored to its level position the spring acts and brings the steering wheel back promptly to its straight ahead position.

As the arm 23 may have various lengths according to whatever is preferred or found most suitable, and as the spring 24 may be of any suitable strength, it is seen that a powerful and quick acting means is provided for rendering the car subject to easy control by the user with a minimum of danger, and with a minimum of pre-requisite skill. As a matter of fact the arm need not be very long, and the spring need not be very stiff in order to give a sufficient quickness of action or control. The supporting eye 25 is preferably a mere eye bolt having its bolt loosely held in the bow 18 so that it can turn freely, or it may be a strip of steel fastened to the bow, the spring passing over it. It allows the use of a relatively long spring, sufficient to permit wide turning of the wheel, by holding the spring up from the tire of the wheel.

In the construction illustrated the bow 18 is curved on a quadrant of a circle and the flanges thereof are turned upward; standing outward on the quadrant, standing into grooves in the inside of the board which constitutes the platform 10, and furnishing lips which firmly bind the bottom end of the handle at its step, preventing it from moving toward either side. Primarily the flanges give the necessary strength and stiffness to the bow, but incidentally they are by this construction made to afford a rigid and doubly strong, although simple, connection to the platform, because of the doubled tongue-and-groove connection firmly held in engagement by the bolts. The handle is prevented from rising by the strut 20, which serves as a tie as well as a strut and is connected to the upper bolt. The lower part of the handle is further held firm by its attachment to the forward extension of the bow which is bent reversely and upwardly and has both a high and a low bolt. The reversely bent portion of this extension engages the top of the spindle 15. The extremity of the main part of the bow engages the bottom of that spindle, and is flat underneath, sitting square upon one part of the combined radial and thrust ball bearing mounted on said spindle. Under these circumstances the spindle is firmly held, although but little metal is used; and the whole piece, comprising the bow and its extensions, holding the spindle, the handle and the platform, can be made by bending from a single piece of sheet metal. If the platform be made of metal it may be integral with the bow. The cross bar 17 may be fastened on the upright 16 in any suitable way, or may be omitted.

In operation the person using the coaster sets it in motion by placing one foot upon the platform and pushing with the other on the floor or sidewalk. When it is in motion the apparatus tends to maintain itself in equilibrium and in a straight forward direction so long as the platform 10 is horizontal laterally, but the car can be steered to the right or left by tipping the car to the right or left. The handle 16 may be and is immobile with respect to the body of the car, so that the person using it needs no thought in turning the steering wheel the proper degree and at the proper time, but that steering wheel automatically turns to the proper degree, and restores itself, corresponding to the tipping of the car. The tipping is controlled either by the user's feet or hands. The most convenient method, and for most uses the most satisfactory, is to control by means of the handle 16, which also serves for steadying the person on the car, and for steadying the car; but one who is expert may coast and steer without touching the handle, merely standing on the platform and doing the balancing by tipping the platform to one side or the other with his foot. The inclination for steering the car around a curve is in the same direction as that to which the person riding thereon instinctively tends in order to avoid being thrown off by centrifugal force. Although the platform 10 is shown as horizontal, from front to rear, it may without disadvantage be inclined upward a little from the rear to the front, the axle of the rear wheel being journaled above the end of the platform. Subject to the qualification that the platform must not be so low as to strike the ground when tipped on a curve, the platform may be placed as low as desired. One form having some advantages consists in making the platform relatively narrow and low at the rear, and inclined upward, and becoming somewhat broader toward the front. This low elevation makes it very safe because the person can easily step from it in case of danger. The stepping from an upwardly inclined platform close to the ground is more easily accomplished, without the person being thrown down, than in stepping from a horizontal platform or one inclined downward and forwardly.

The invention is not limited to the precise construction shown; and it is the object of the Letters Patent to protect by suitable expression in the appended claims whatever features of patentable novelty pertaining to the car exist in the invention disclosed.

I claim as my invention:

1. A coaster having in combination a single pair of tandem wheels; a platform supported thereby; and a fork from the axle of the forward wheel, having a pivotal connection with the platform at a point above said wheel and forward of its point of tread contact, the whole arranged and adapted to be tipped laterally about the wheel treads and thereby to be steered; and said platform having a surface for supporting the rider arranged between the wheels and below the level of the top of said forward wheel, and having a handle secured rigidly and non-rotatably with respect to the platform whereby the rider may control the tipping.

2. A coaster comprising in combination a single pair of tandem wheels and a platform at a level below the top of the forward wheel, the whole being adapted to tip toward either side about the wheel treads; a fork on the axle of the forward wheel having pivotal connection to the platform above said wheel and forward of its point of tread contact; an arm over the wheel extending backward rigidly from the fork and swinging with the wheel; an extensible spring joining said arm to a part that is rigid with said platform, below the level of the crest of the wheel; and means on the platform holding the intermediate portions of the spring clear of the wheel, the fore part and the aft part of the spring making an angle with each other at said supporting means.

3. A coaster having in combination a platform, tandem wheels, fork mounting the axle of the forward wheel, with spindle and bearing supporting the platform above and forward of the point of tread contact, part of the platform being a rigid metallic strip reaching from below over the top of the wheel to said bearing, and a rigid handle extending upward from a place thereon at the rear of said bearing.

4. A coaster having in combination a platform, tandem wheels, a fork mounting the axle of the forward wheel, with spindle and bearing supporting the platform above said wheel and forward of its point of tread contact, whereby the coaster is steered by being tipped; said platform having a surface for supporting the rider arranged below the level of said bearing and a metallic strip extending upward and forward over the wheel to, and forward of said bearing, thence upward and then backward affording another bearing for said spindle somewhat remote from the first, and thence upward as a rigid support for said handle.

5. A coaster having in combination a platform, tandem wheels, a fork mounting the axle of the forward wheel, with spindle and bearing supporting the platform above and forward of the point of tread contact, part of the platform being a rigid metallic strip reaching from below over the top of the wheel to said bearing, and a rigid handle extending upward from a place thereon at the rear of said bearing, the said strip passing over the wheel being of flanged sheet metal, and the handle being stepped thereon between and held by the flanges.

6. A coaster having in combination a platform, tandem wheels, a fork mounting the axle of the forward wheel, with spindle and bearing supporting the platform above and forward of the point of tread contact, part of the platform being a rigid metallic strip reaching from below over the top of the wheel to said bearing, and a rigid handle extending upward from a place thereon at the rear of said bearing, the said platform having a wooden part for supporting the rider, resting on the rear of said metallic strip, and said strip having flanges extending upward into grooves in said wood and extending along the part that is over the wheel back of the bearing.

7. A coaster having in combination a platform, tandem wheels, a fork mounting the axle of the forward wheel, with spindle and bearing supporting the platform above said wheel and forward of its point of tread contact, whereby the coaster is steered by being tipped; said platform having a surface for supporting the rider arranged below the level of said bearing, and a metallic strip extending upward and forward over the wheel to and forward of said bearing, thence upward and then backward affording another bearing for said spindle somewhat remote from the first, and thence upward as a rigid support for said handle; a strut back of the handle reaching from the low rear to the raised forward part of the said strip and means clamping it and the handle rigidly together at its forward end, and it and the strip and the low part of the platform rigidly together at its rear end.

8. A coaster, having in combination a platform provided with an approximately horizontal part to support the rider, tandem wheels, a fork mounting the axle of the forward wheel, with spindle and bearing supporting the platform above and forward of the point of tread contact; there being a metallic piece extending under the horizontal part, over the wheel, under the handle and forward of the handle; another metallic piece over the horizontal part, over the wheel and back of the handle; and means clamping the horizontal part rigidly between the rear ends of these pieces and the handle rigidly between their forward ends.

Signed by me at Boston, Mass., this 29th day of November, 1916.

CHARLES H. JOHNSON.

Copies of this patent may be obtained for five cents each, by addressing the "Commissioner of Patents, Washington, D. C."